United States Patent
Green

(10) Patent No.: US 6,568,885 B2
(45) Date of Patent: May 27, 2003

(54) MACHINING CELL WITH DEBRIS SHIELDS

(75) Inventor: Lanny Green, Grass Lake, MI (US)

(73) Assignee: Ann Arbor Machine Company, Chelsea, MI (US)

(*) Notice: Subject to any disclaimer, the term of this patent is extended or adjusted under 35 U.S.C. 154(b) by 0 days.

(21) Appl. No.: 10/262,165

(22) Filed: Oct. 1, 2002

(65) Prior Publication Data

US 2003/0026671 A1 Feb. 6, 2003

Related U.S. Application Data

(62) Division of application No. 09/643,623, filed on Aug. 22, 2000, now Pat. No. 6,457,918.

(51) Int. Cl.$^7$ .............................. B23C 1/04; B23C 9/00; B23Q 11/08

(52) U.S. Cl. ................... 409/134; 29/DIG. 102; 29/DIG. 94; 29/DIG. 86; 29/DIG. 60; 74/609; 451/451; 451/455; 160/202; 160/220; 52/64; 408/53; 408/241 G; 409/192

(58) Field of Search ............................. 409/134, 137, 409/192, 203, 213, 217; 29/DIG. 102, DIG. 94, DIG. 86, DIG. 60, DIG. 59, DIG. 56, DIG. 53; 74/608–609, 612–613; 451/451, 455; 160/202, 220; 52/64, 67; 408/53, 241 G

(56) References Cited

U.S. PATENT DOCUMENTS

| | | | | |
|---|---|---|---|---|
| 2,655,067 A | * | 10/1953 | Bechler | 451/451 |
| 3,824,890 A | * | 7/1974 | Zettler et al. | 409/134 |
| 4,226,322 A | * | 10/1980 | Peris | 192/135 |
| 4,484,387 A | * | 11/1984 | Nachmany | 409/137 |
| 4,535,527 A | * | 8/1985 | Fischer et al. | 409/217 |
| 5,178,499 A | * | 1/1993 | Umeda et al. | 409/134 |
| 5,367,754 A | * | 11/1994 | Sheehan et al. | 29/27 C |
| D366,061 S | * | 1/1996 | Likins et al. | D18/57 |
| D374,891 S | * | 10/1996 | Bornhorst et al. | D18/57 |
| 5,897,430 A | * | 4/1999 | Haller | 451/451 |
| 6,325,195 B1 | * | 12/2001 | Doherty | 160/120 |
| 6,364,582 B1 | * | 4/2002 | Hoppe et al. | 409/134 |
| 6,457,918 B1 | * | 10/2002 | Green | 409/134 |

FOREIGN PATENT DOCUMENTS

| | | | |
|---|---|---|---|
| DE | 3545192 A1 | * | 6/1987 |
| DE | 4326546 A1 | * | 2/1995 |
| JP | 5-60294 A | * | 3/1993 |

* cited by examiner

Primary Examiner—A. L. Wellington
Assistant Examiner—Erica E Cadugan
(74) Attorney, Agent, or Firm—Olson & Hierl, Ltd.

(57) ABSTRACT

A machining cell capable of providing tool movement along at least one axis is provided with at least one, but preferably a pair of articulated debris shields mounted to a tool carriage that translates along an axis of motion. Each articulated debris shield occludes space vacated by the tool carriage as it translates along the axis of motion. In a preferred embodiment, the machining cell provides tool movements along x-, y-, and z-axes and has a stationary housing that supports a z-axis carrier frame slidably mounted thereto for translation along the z-axis. An x-axis carriage is slidably mounted to the z-axis carrier frame for translation along the x-axis. A y-axis spindle frame is slidably mounted to the x-axis carrier frame for vertical translation along the y-axis. Articulated debris shields constituted by folding panels are connected to the x-axis carriage and to the z-axis carrier frame for occluding gaps between the x-axis carriage and the z-axis carrier frame as the x-axis carriage translates relative to the z-axis carrier frame.

6 Claims, 7 Drawing Sheets

MACHINING CELL WITH DEBRIS SHIELDS

REFERENCE TO RELATED APPLICATIONS

The present application is a division of U.S. patent application Ser. No. 09/643,623 filed on Aug. 22, 2000, now U.S. Pat. No. 6,457,918.

TECHNICAL FIELD OF THE INVENTION

This invention relates generally to machining tools and more generally to computerized numerically controlled machining cells.

BACKGROUND OF THE INVENTION

A machining cell provides accurate and relatively rapid computer-controlled movements of a machine tool relative to a workpiece. The tool is mounted in a motor-driven spindle that is translated along a predetermined axis of motion, typically along mutually orthogonal x-, y- and z-axes relative to the workpiece, to make the cut or cuts necessary to machine the workpiece to the desired shape. Controlled movements of the spindle can be effected hydraulically or electrically using appropriate electronic controls, e.g., a CNC controller. Accurate translation of the spindle along each respective axis is provided by precisely machined guide surfaces that slide relative to each other. To maintain accuracy, it is important that the electronics, hydraulics and guide surfaces remain free of contamination. During the machining process, debris such as metal chips or shavings, as well as coolant spray, are necessarily generated by the tool working against the workpiece. Such debris, especially the chips or shavings, tend to be scattered from the machine tool in various directions, with the consequent risk that some of the chips or shavings might contaminate the nearby electronics, hydraulics or guide surfaces of the machining cell. Alleviating the risk of such contamination is a desirable goal.

SUMMARY OF THE INVENTION

A machining cell capable of providing tool movement along at least one axis of motion includes a stationary base, a tool carriage slidably mounted to the base for translation along an axis of motion, and an articulated debris shield on at least one side, and preferably on each side, of the tool carriage. Both articulated debris shields are connected to the respective sides of the tool carriage and occlude space vacated by the tool carriage as the tool carriage translates along its axis of motion. Each articulated debris shield is made up of hinged panels that fold and unfold as the tool carriage translates.

A preferred embodiment of the present invention involves a machining cell that provides tool movements in several predetermined directions, for example, along mutually orthogonal x-, y-, and z-axes. In a particularly preferred embodiment, a stationary bed has a z-axis carrier frame slidably mounted thereto for translation along the z-axis. An x-axis carriage is slidably mounted to the z-axis carrier frame for translation along the x-axis. A y-axis spindle frame or headstock can be slidably mounted to the x-axis carrier frame for vertical translation along the y-axis, if desired. A pair of articulated, upstanding debris shields is mounted to the z-axis carrier frame and is connected to the x-axis carriage for occluding gaps between the x-axis carriage and the z-axis carrier frame. The gaps vary in width as the x-axis carriage translates along the x-axis relative to the z-axis carrier frame, and the articulated debris shields fold and unfold as needed to occlude the gaps.

The machining cell, in turn, can be enveloped by a slidable cage, preferably with transparent side panels, that provides a further guard function for the machining cell.

An advantage of the present invention is that the risk of debris such as metal chips or shavings passing through the gap to contaminate other components of the machining cell is alleviated. Other advantages of the invention will be apparent from the following description of preferred embodiments made with reference to the drawings.

DESCRIPTION OF THE PREFERRED EMBODIMENT

Figure 1:
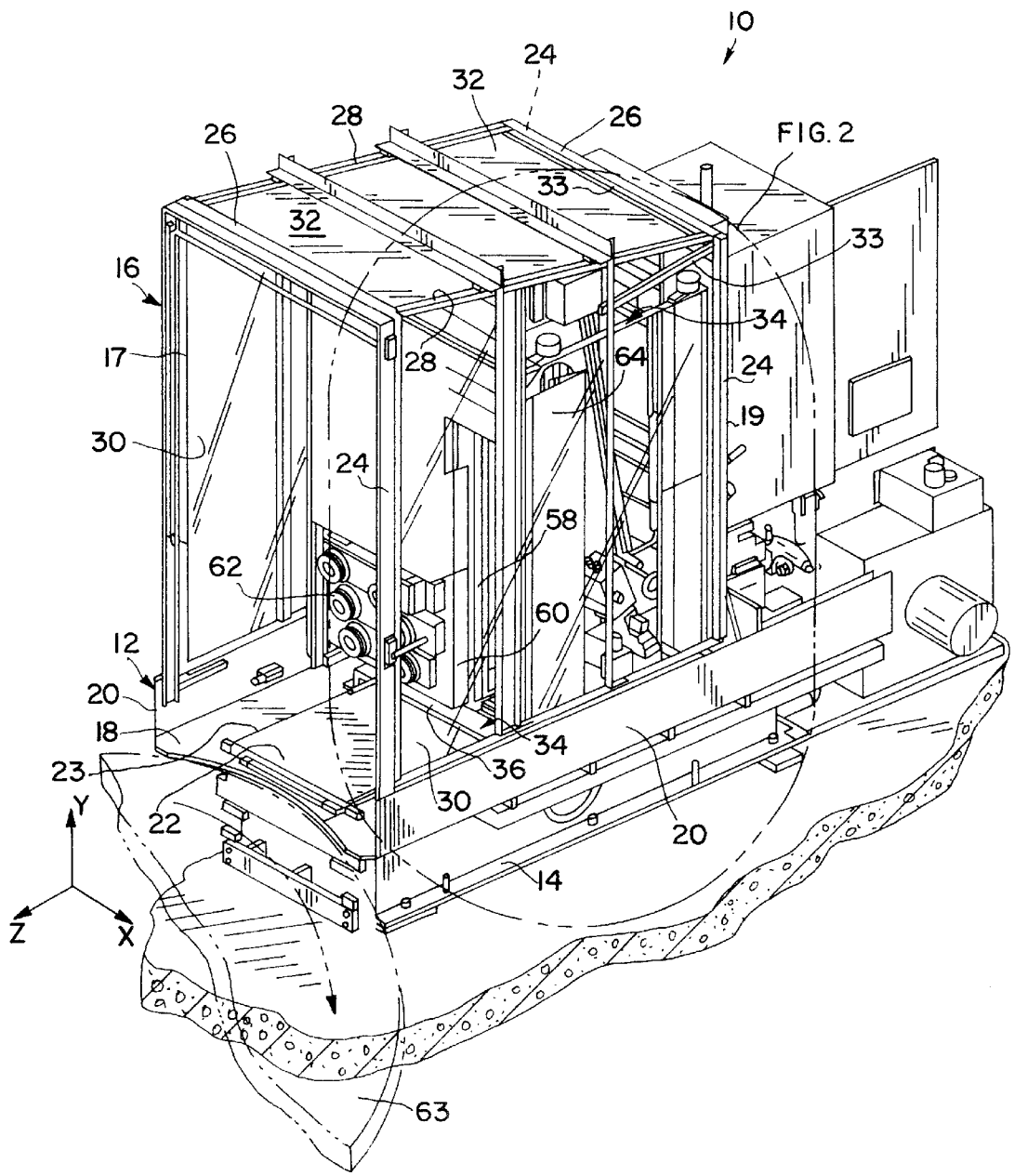
FIG. 1 is a perspective view of a machining cell configured in accordance with the present invention.
Figure 2:
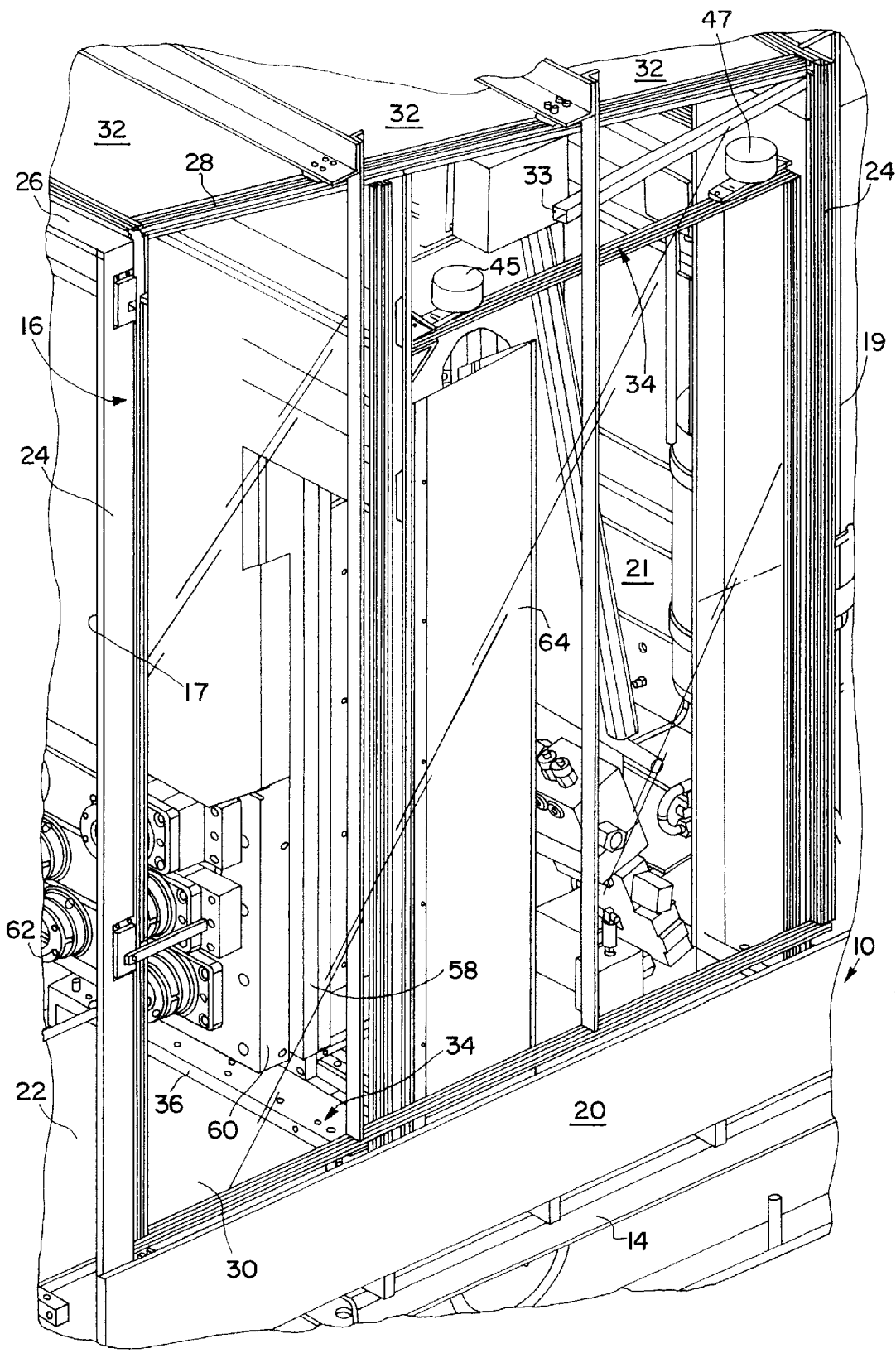
FIG. 2 is an enlarged perspective view of a portion of the machining cell of FIG. 1.

Referring to FIGS. 1 and 2, a machining cell 10 is illustrated oriented relative to mutually orthogonal axes x, y and z, wherein the x- and z-axes are oriented horizontally while an optional y-axis is oriented vertically. One or more such machining cells can be positioned adjacent a given workpiece to perform machining operations thereon. As used herein, the term "longitudinal" refers to an orientation substantially parallel to the z-axis, and the term "transverse" refers to an orientation substantially parallel to the x-axis. Certain components of machining cell 10 translate along respective ones of the x-, y- and z-axes, as described further below.

Machining cell 10 includes a stationary bed 12 with a machine base 14, and an enclosure frame or cage 16 movably mounted thereon for movement along the z-axis. In particular, cage 16 can ride on rails 25 (FIG. 7) and the like provided in upstanding skirts 20 that extend from floor 18 of machine base 14.

Z-axis base plate 22 is fixed to machine floor 18, and thus to base 14. Guide edges .23 of base plate 22 are parallel to the z-axis.

Figure 7:
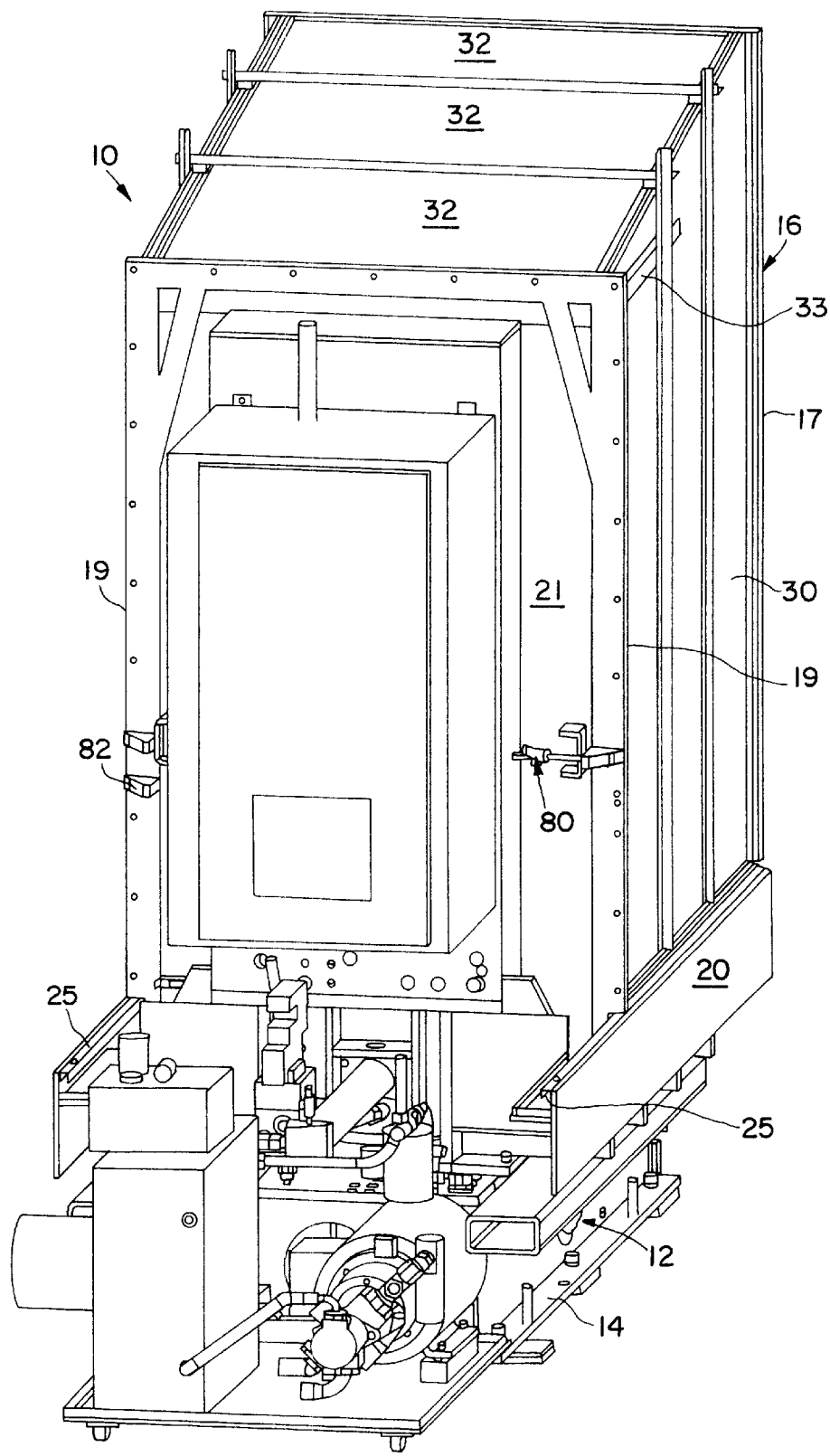
FIG. 7 is a rear perspective view of the machining cell of FIG. 1.

Case 16 has an open front end 17 and a rear end 19 occluded by upstanding rear bulkhead 21 (FIG. 7). Cage 16 includes four upright corner members 24 connected by transverse top members 26 and longitudinal top members 28, all arranged to form box-like cage 16. Side panels 30, at least one preferably transparent, are provided for cage 16, as well as a top panel 32. A suitable material of construction for transparent panels is a polycarbonate resin, e.g., a polycarbonate resin commercially available under the designation "Lexan." In this manner, cage 16 provides protection from, as well as opportunity for visual inspection of, the working parts of machining cell 10. To gain access to the working parts for maintenance and/or repair, cage 16 can be shifted to one side along the aforementioned rails 25 or the like. Top panel 32 can also be transparent, if desired, and preferably slopes rearwardly so as to drain toward the rear any condensate that may accumulate on the underside thereof during operation of the machining cell. A gutter 33 can be provided within cage 16 in proximity of top panel 32 to drain away any collected condensate from the rearward most edge of top panel 32 and guide any such condensate back onto bed 12 even when the cage is retracted.

As shown in FIGS. 3–6, disposed on bed 12 and particularly within cage 16 is a z-axis carrier frame 34 that is mounted for translation along the z-axis. Z-axis carrier frame 34 includes a base member 36 mounted in sliding engagement with z-axis base plate 22 and is constrained by the guide edges 23 thereof to translate along the z-axis. Base member 36 supports a frame 38 which includes upright leading edge corner members 40, upright trailing edge corner members 41, longitudinal top members 42, and transverse top members 44, all arranged and connected to form a box-like unit. Z-axis carrier frame 34 also supports an x-axis base plate 46 having guide edges parallel to the x-axis. Base member 36, frame 38 and x-axis base plate 46 translate as a unit along the z-axis. Rollers 45 and 47 at upper corners of z-axis carrier frame 34 abut the inside surface of side panels 30 and facilitate a sliding movement of these panels to provide access for maintenance purposes and the like. At the same time the stiffness of frame 34 contributes to the stability of the entire outer guard structure.

Again referring to FIGS. 3–6, further disposed within cage 16 on bed 12 is an x-axis carriage 48 supported by z-axis carrier frame 34. More particularly, x-axis carriage 48 is mounted in sliding engagement with x-axis base plate 46 and is constrained by the guide edges thereof to translate along the x-axis. In the embodiment shown, x-axis carriage 48 supports a hydraulic cylinder 50 fixed thereto having a rod 52 fixed to z-axis carrier frame 34. Cylinder 50 and rod 52 are actuated by hydraulic control valve 54 to effect translation of x-axis carriage 48 along the x-axis relative to z-axis carrier frame 34. Control valve 54 communicates with other hydraulic control and pump apparatus, not shown. Other arrangement of parts can be made as well.

X-axis carriage 48 further includes a front edge 56 which (referring now to FIGS. 1 and 2) supports a vertical guide 58 having guide edges parallel to the y-axis. A y-axis spindle frame 60 is mounted in sliding engagement with vertical guide 58 and is constrained by the guide edges thereof to translate vertically along the y-axis. Spindle frame 60, in turn, supports one or more spindles 62 which carry machine tools.

Before considering additional structural features of the preferred embodiment, the relative movements of the elements described heretofore shall be summarized briefly. The spindle 62, carrying a machine tool, can translate along each of three mutually orthogonal axes, x, y and z, to effect a machining operation on a workpiece (not shown) positioned on indexing turret 63. Vertical translation along the y-axis is effected by vertical translation of spindle frame 60, which carries spindle 62, relative to vertical guide 58 and hence to x-axis carriage 48. Horizontal translation along the x-axis is effected by transverse translation of x-axis carriage 48 relative to z-axis carrier frame 34. Horizontal translation along the z-axis is effected by longitudinal translation of z-axis carrier frame 34 relative to stationary housing 12. Plural spindles 62 in a high speed machining cell carried by the same spindle frame result in considerable time savings as compared to an automatic tool changer.

Figure 3:
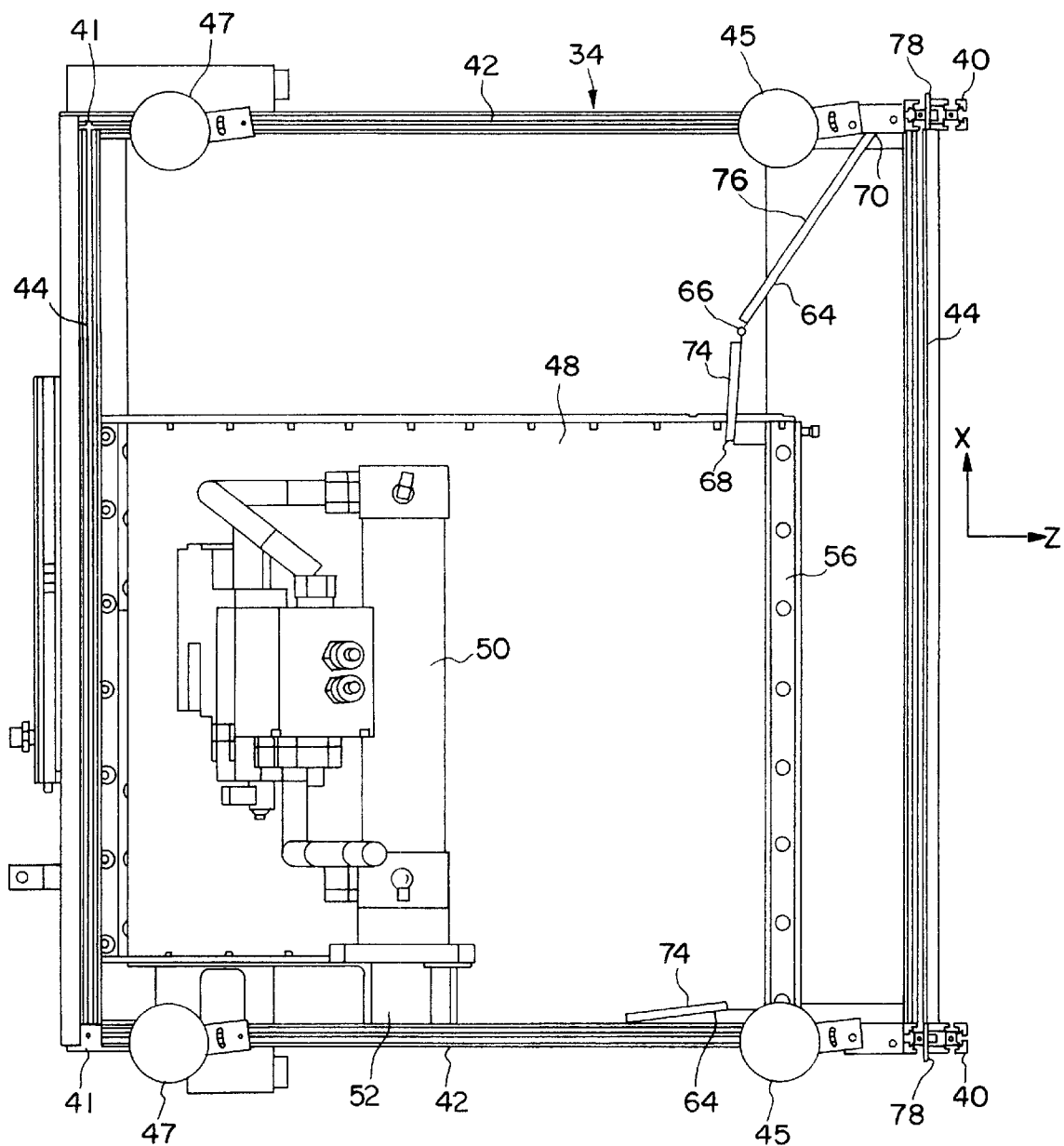
FIG. 3 is a plan view of a z-axis carrier frame and x-axis carriage of the machining cell of FIG. 1.

Connected to x-axis carriage 48 and z-axis carrier frame 34 are a pair of articulated debris shields 64. Each debris shield 64 includes a set of articulated panels 74 and 76, preferably rigid and joined at and articulated about a vertical hinge line 66 located intermediate inside edge 68 and outside edge 70 of shield 64. As shown in FIG. 3, panels 74 and 76 are of unequal width. The width of these panels can be selected as required for a particular machining cell, however. With respect to general configuration, articulated debris shield 64 is similar to a bi-fold door of the type often used as a closet door. Inside edge 68 of shield 64 is pivotally connected by a hinge to x-axis carriage 48, and outside edge 70 is pivotally mounted by a hinge, directly or indirectly, to z-axis carrier frame 34 for pivoting about a vertical axis. Consequently, as x-axis carriage 48 translates transversely relative to z-axis carrier frame 34, debris shield 64 articulates about hinge line 66 with inside edge 68 pivoting relative to x-axis carriage 48 and outside edge 70 pivoting relative to z-axis carrier frame 34. As can be seen in FIG. 3, panel 74 which is connected to x-axis carriage 48 preferably is relatively narrower than panel 76 mounted to z-axis carrier frame 34.

Throughout the range of transverse translation along the x-axis, debris shield 64 serves to substantially occlude the gap between x-axis carriage 48 and z-axis carrier frame 34, which gap varies in width between a minimum and maximum horizontal distance. This serves the useful function of alleviating the risk of debris such as metal chips or shavings or coolant spray generated at the spindle 62 passing through an open gap that would otherwise exist between x-axis carriage 48 and z-axis carrier frame 34. The passage of debris into the region behind spindles 62 is undesirable because of the risk that such debris would contaminate the precision guide surfaces, hydraulics or electronics located there.

Figure 4:
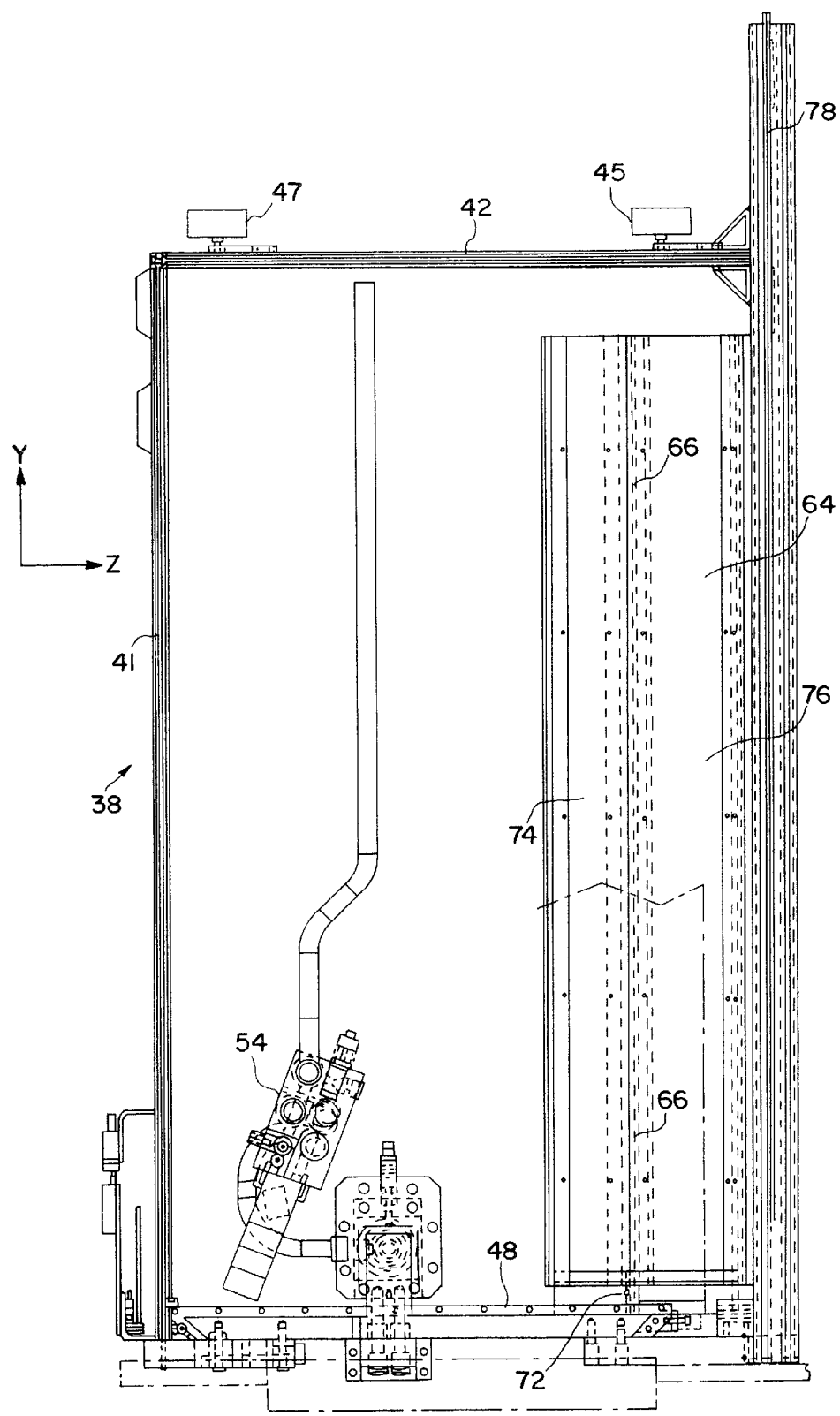
FIG. 4 is a side elevation view of the z-axis carrier frame and x-axis carriage of FIG. 3.
Figure 5:
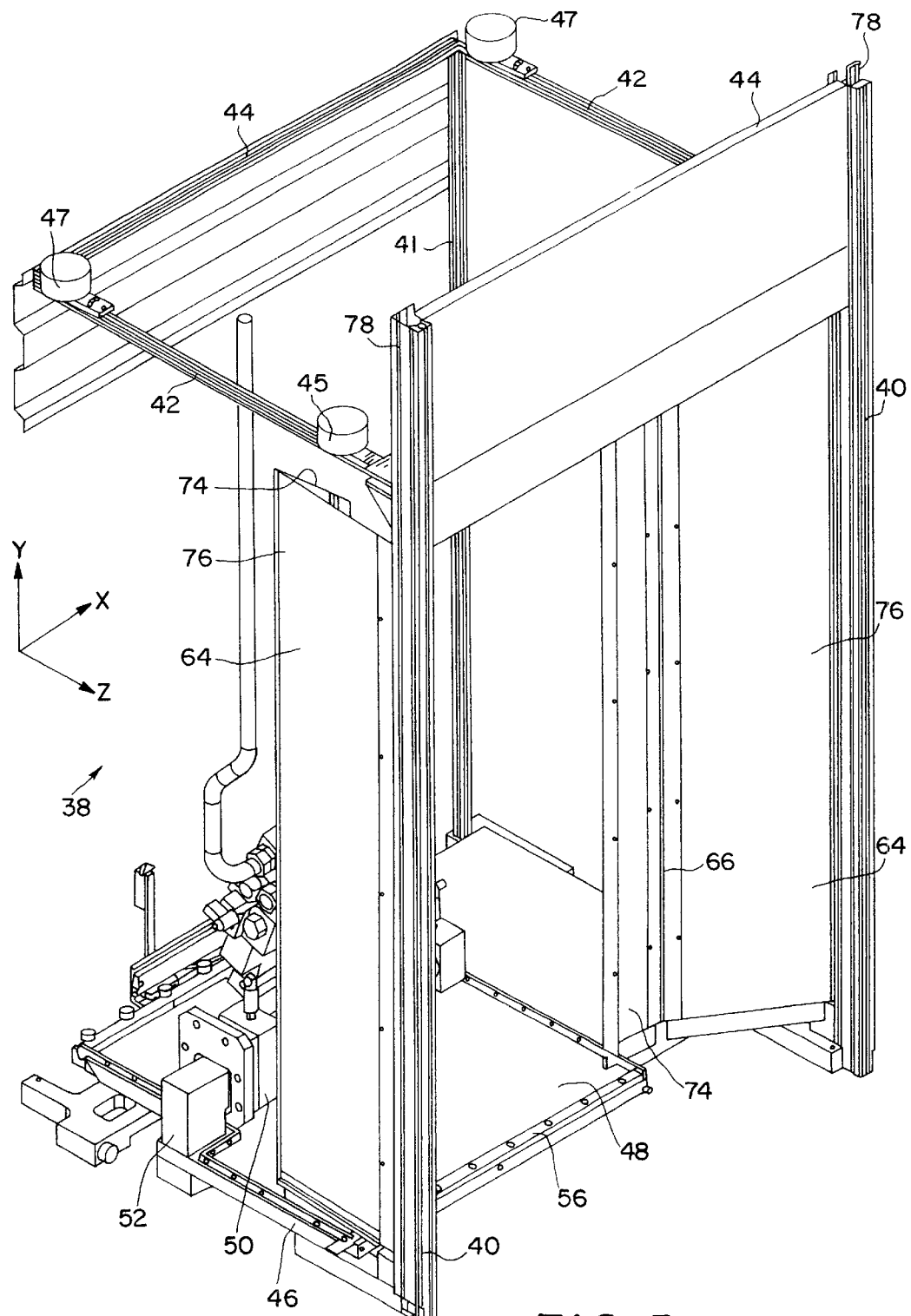
FIG. 5 is a perspective view of the z-axis carrier and x-axis carriage of FIG. 3.
Figure 6:
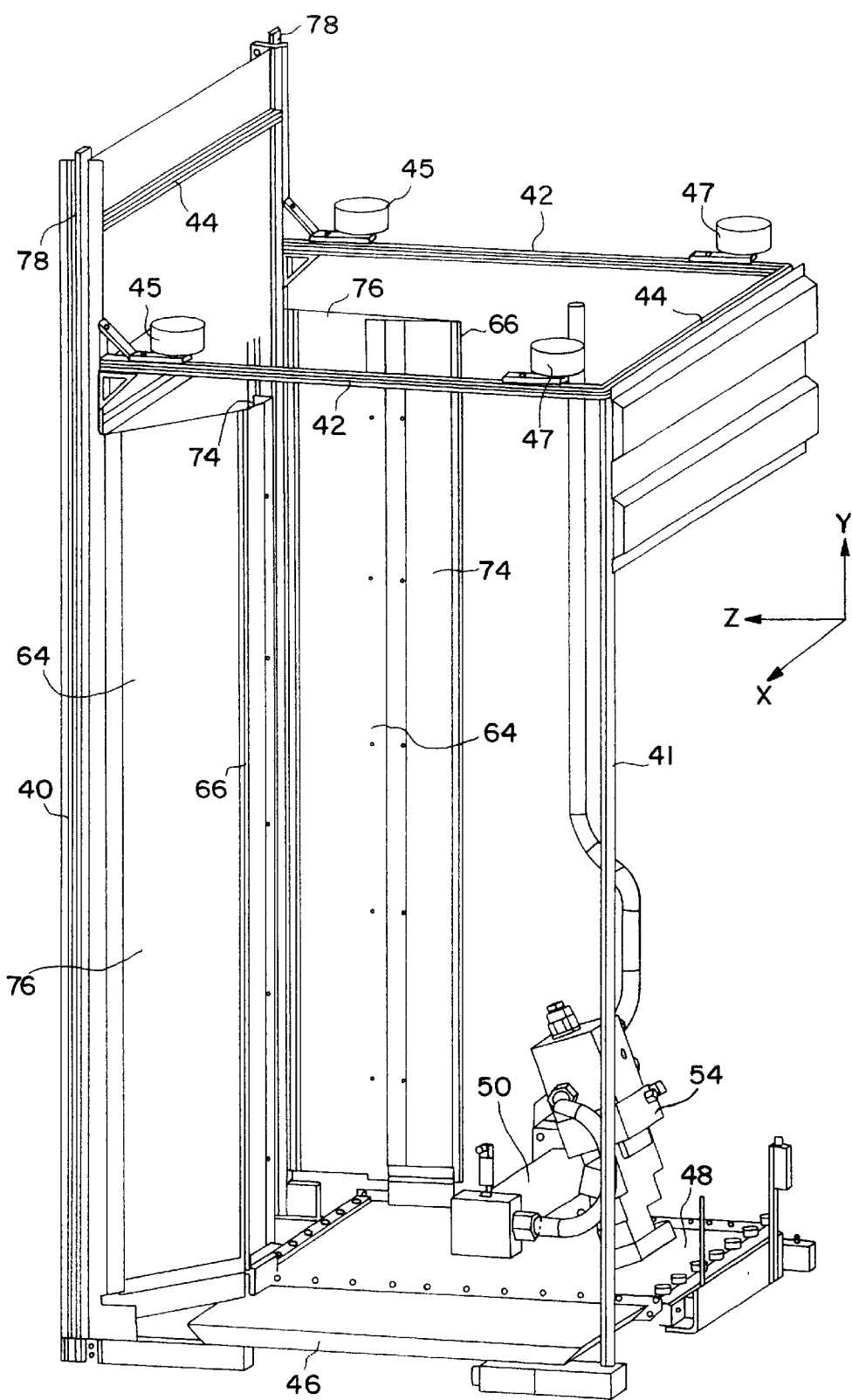
FIG. 6 is another perspective view of the z-axis carrier frame and x-axis carriage of FIG. 3.

Referring particularly to FIG. 4, a brush device 72 having generally vertically oriented, downwardly extending bristles provides a flexible closure between the adjacent articulated panels 74 and 76 of debris shield 64 at hinge line 66. Brush device 72 extends downwardly at the bottom end of debris shield 64.

Referring especially to FIGS. 3–6, a vertical flexible wiper blade 78, preferably made of an elastomeric material, extends outwardly from each of the two upright leading edge corner members 40 proximate spindle 62. Wiper blade 78 contacts the inner surface of slidably mounted, contiguous transparent side access panel 30, provides a seal between the z-axis carrier frame 34 and cage 16, and also wipes side panel 30 as z-axis carrier frame 34 translates along the z-axis. This further serves the useful purpose of continually cleaning the inner surface of side panel 30 during machining operations to remove adhering dust, oil, condensation, or other substances that would otherwise accumulate on side panel 30 and block visual inspection of the components located within enclosure frame 16.

Referring to FIG. 7, bulkhead 21 occludes the rear portion 19 of cage 16. Bulkhead 21 co-acts with cage 16 to seal the interior of the machining cell and also provides support for the necessary service connections to machining cell 10. To that end, bulkhead 21 can be provided with weatherstripping at its interface with rear portion 19. Such a seal retains coolant and mist within the machining cell, and assists in maintaining a dry floor environment. Additionally, bulkhead 21 is equipped with a securement means, such as latch assembly 80 and the like, for securing cage 16 in place during normal operation of machining cell 10. For safety purposes, cage 16 can be provided with a gate switch 82, preferably with a key, mounted to rear portion 19 and a corresponding switch body mounted to bulkhead 21.

Although the present invention has been described with particularity with respect to a preferred embodiment thereof, no limitation of the scope of the invention is thereby intended. The subject matter which applicant regards as his invention and in which he claims an exclusive right is defined by the claims appended below.

I claim:

1. A guard structure for a machining cell having a stationary base and machining tools together with respective drives therefor slidably mounted to the stationary base for movement along an axis comprising a cage enveloping at least the machining tools slidably mounted to the stationary base and provided with side panels, said cage being slidable on the stationary base along the axis from a front position enveloping the machining tools to a rear position exposing the machining tools for access thereto;

wherein the machining cell has an upstanding rear bulkhead fixedly mounted to the base and the cage is provided at a rear portion thereof with a securing means for securing the cage to the bulkhead;

and wherein the bulkhead is located rearwardly of the drives.

2. The guard structure of claim 1 wherein a transparent side panel is provided on at least one side of the guard structure.

3. The guard structure of claim 2 wherein a further transparent panel is provided on a top of the cage.

4. The guard structure of claim 1 wherein said cage has a rearwardly sloping top panel.

5. The guard structure of claim 4 wherein said cage is provided with a gutter positioned to receive condensate accumulating on the underside of the rearwardly sloping top panel.

6. The guard structure of claim 1 wherein the securing means is a latch assembly.

* * * * *